United States Patent
Creech et al.

(10) Patent No.: US 10,808,768 B2
(45) Date of Patent: Oct. 20, 2020

(54) LINEAR ACTUATOR MECHANISM AND USE IN A VEHICLE AXLE DISCONNECT/CONNECT SYSTEM

(71) Applicant: DANA AUTOMOTIVE SYSTEMS GROUP, LLC, Maumee, OH (US)

(72) Inventors: Michael Z. Creech, Ann Arbor, MI (US); Krishna Kumar, West Bloomfield, MI (US); William F. Waltz, Toledo, OH (US); Robert A. Wright, Haskins, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 6 days.

(21) Appl. No.: 16/346,559

(22) PCT Filed: Nov. 1, 2017

(86) PCT No.: PCT/US2017/059467
§ 371 (c)(1),
(2) Date: May 1, 2019

(87) PCT Pub. No.: WO2018/085345
PCT Pub. Date: May 11, 2018

(65) Prior Publication Data
US 2019/0264753 A1    Aug. 29, 2019

Related U.S. Application Data (60) Provisional application No. 62/415,609, filed on Nov. 1, 2016, provisional application No. 62/513,687, filed on Jun. 1, 2017.

(51) Int. Cl.
*F16H 63/30* (2006.01)
*F16H 63/32* (2006.01)
(Continued)

(52) U.S. Cl.
CPC .............. *F16D 11/10* (2013.01); *B60K 17/35* (2013.01); *F16H 63/32* (2013.01);
(Continued)

(58) Field of Classification Search
None
See application file for complete search history.

(56) References Cited

U.S. PATENT DOCUMENTS 4,625,584 A    12/1986 Onodera
5,517,876 A *  5/1996 Genise .................. F16H 63/304
                                                         74/473.24
(Continued)

FOREIGN PATENT DOCUMENTS

EP          0695892         2/1996
JP       2012072829    *    4/2012
(Continued)

OTHER PUBLICATIONS

Machine language translation of JP2012072829.*
(Continued)

*Primary Examiner* — Mark A Manley
(74) *Attorney, Agent, or Firm* — Marshall & Melhorn, LLC (57) ABSTRACT

Linear actuator mechanisms (100) for vehicle disconnect/connect systems having a stationary guide rod (122); a shift fork (118) the stationary guide rod extends therethough; a drive nut (110); a drive screw (120) extending through the drive nut; a first spring plate (114), a second spring plate (116), and a compression spring (112) positioned between a radially extending portion of the first spring plate and a radially extending portion of the second spring plate. A second radially extending portion of the first spring plate and a second radially extending portion of the second spring plate are in contact with the drive nut on axially opposite (Continued)

sides of the drive nut. The first and second spring plates are moveable axially along the stationary guide rod by the drive nut to compress the compression spring.

19 Claims, 10 Drawing Sheets

(51) Int. Cl.
*F16D 11/10* (2006.01)
*B60K 17/35* (2006.01)
*F16D 23/14* (2006.01)
*F16D 11/00* (2006.01)

(52) U.S. Cl.
CPC .. *F16D 2011/002* (2013.01); *F16D 2023/141* (2013.01); *F16H 2063/3063* (2013.01); *F16H 2063/3089* (2013.01)

(56) References Cited

U.S. PATENT DOCUMENTS

| | | |
|---|---|---|
| 8,162,122 B2 | 4/2012 | Turner |
| 8,545,125 B2 | 10/2013 | Brown |
| 9,574,662 B2 | 2/2017 | Park |
| 2016/0243936 A1 | 8/2016 | Yoshimura |
| 2017/0028846 A1 | 2/2017 | Takaira |

FOREIGN PATENT DOCUMENTS

| | | |
|---|---|---|
| KR | 101666135 | 10/2016 |
| WO | 2015027053 | 2/2015 |

OTHER PUBLICATIONS

European Patent Office, International Search Report and Written Opinion in Application No. PCT/US2017/059467, dated May 3, 2018, 12 pages, Rijswijk, Netherlands.

\* cited by examiner

LINEAR ACTUATOR MECHANISM AND USE IN A VEHICLE AXLE DISCONNECT/CONNECT SYSTEM

RELATED APPLICATIONS

The present application claims the benefit of U.S. Provisional Application Nos. 62/513,687 filed on Jun. 1, 2017, and 62/415,609 filed on Nov. 1, 2016, which are incorporated herein by reference in their entirety.

BACKGROUND

It is well-known that motor vehicles may have more than one driving wheel. In some cases, such as in passenger vehicles with four wheels, all four wheels can be driven. There are instances, however, where it is desirable to only drive certain wheels of the vehicle. In these cases, the wheels, or the axles they are associated with, must be disconnected from the drive system. Additionally, when it is desired to have the disconnected wheel drive again, the wheel has to be connected back into the drive system.

Drivelines disconnect/connect systems for disconnecting/connecting wheels or axle of motor vehicle can utilize linear actuator assemblies having an actuator that moves a shift fork axially along a drive screw to selectively engage or disengage an axle shaft. The movement of the shift fork causes an axial movement of a clutch member, or of a gear carrying clutch teeth, or of a jaw clutch. Linear actuators commonly include an electric drive motor that is connected to the drive screw. Rotation of the drive screw by the electric motor causes a drive nut to move axially along the drive screw in order to impart axial motion to a connected shift fork.

Some linear actuator assemblies incorporate a spring to store energy and move the shift fork to push gears into and out of engagement when the gears are aligned. However, if torque is transmitted through disconnected gears when a disengagement is attempted, the actuator continues to attempt to disengage until the thermal limit of the actuator assembly is reached causing damage. It is costly to control the current of the motor to prevent a thermal limit occurrence and a significant amount of time is needed to the allow system to cool once the limit is hit. Additionally, the thermal energy and torque can damage the shift fork and/or collars of the assemblies.

In view of the problems noted above, it would be desirable to have a linear actuator assembly that provides smoother, more reliable shifts of the shift collar to the on-going splines and allows the use of a shift collar and shift fork made of a lighter and less expensive material, resulting in a more cost effective system.

SUMMARY

Provided herein is a linear actuator mechanism having a stationary guide rod; a shift fork having a sleeve portion, wherein the stationary guide rod extends through the sleeve portion; a drive nut having an aperture therethrough; a drive screw that extends through the aperture of the drive nut parallel to, and radially above, the stationary guide rod; a first spring plate having an axially extending portion, a first radially extending portion and a second radially extending portion extending in the opposite direction of the first radially extending portion, wherein the axially extending portion connects the first and second radially extending portions; a second spring plate having an axially extending portion, a first radially extending portion and a second radially extending portion extending in the opposite direction of the first radially extending portion, wherein the axially extending portion connects the first and second radially extending portions; and a compression spring positioned between the first radially extending portion of the first spring plate and the first radially extending portion of the second spring plate. The second radially extending portion of the first spring plate and the second radially extending portion of the second spring plate are in contact with the drive nut on axially opposite sides thereof. The drive nut is axially movable along the drive screw. The first and second spring plates are moveable axially along the stationary guide rod by the drive nut to compress the compression spring.

Provided herein is a linear actuator mechanism having a stationary guide rod including a first guide rod piece and a second guide rod piece; a first bushing attached to the first guide rod piece; a second bushing attached to the second guide rod piece; a spring rod having two axial ends, wherein a first axial end is connected to the first bushing and a second axial end is connected to the second bushing; a shift fork having a sleeve portion, wherein the spring rod extends through the sleeve portion; a drive nut having an aperture therethrough; a drive screw that extends through the aperture of the drive nut parallel to, and radially above, the spring rod; a first spring plate having an axially extending portion, a first radially extending portion and a second radially extending portion extending in the opposite direction of the first radially extending portion, wherein the axially extending portion connects the first and second radially extending portions; a second spring plate having an axially extending portion, a first radially extending portion and a second radially extending portion extending in the opposite direction of the first radially extending portion, wherein the axially extending portion connects the first and second radially extending portions; and a compression spring positioned between the first radially extending portion of the first spring plate and the first radially extending portion of the second spring plate. The second radially extending portion of the first spring plate and the second radially extending portion of the second spring plate are in contact with the drive nut on axially opposite sides thereof. The drive nut is axially movable along the drive screw. The first and second spring plates are moveable axially along the spring rod by the drive nut to compress the compression spring.

Provided herein is a linear actuator mechanism having a spring rod having two axial ends, wherein a first axial end is connected to a first nut and a second axial end is connected to a second nut; a shift fork having a sleeve portion, wherein the spring rod extends through the sleeve portion; a drive nut having an aperture there through; a drive screw that extends through the aperture of the drive nut parallel to, and radially, above the spring rod; a first spring plate having an axially extending portion, a first radially extending portion and a second radially extending portion extending in the opposite direction of the first radially extending portion, wherein the axially extending portion connects the first and second radially extending portions; a second spring plate having an axially extending portion, a first radially extending portion and a second radially extending portion extending in the opposite direction of the first radially extending portion, wherein the axially extending portion connects the first and second radially extending portions; a compression spring positioned between the first radially extending portion of the first spring plate and the first radially extending portion of the second spring plate; and a housing having two axially opposing pockets, wherein the first nut is positioned within a first pocket and the a second nut is positioned within a second pocket. The second radially extending portion of the first spring plate and the second radially extending portion of the second spring plate are in contact with the drive nut on axially opposite sides thereof. The drive nut is axially movable along the drive screw. The first and second spring plates are moveable axially along the spring rod by the drive nut to compress the compression spring.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Novel features of the preferred embodiments are set forth with particularity in the appended claims. A better understanding of the features and advantages of the present embodiments will be obtained by reference to the following detailed description that sets forth illustrative embodiments, in which the principles of the devices are utilized, and the accompanying drawings of which:

DETAILED DESCRIPTION OF THE PREFERRED EMBODIMENTS

It is to be understood that the preferred embodiments may assume various alternative orientations and step sequences, except where expressly specified to the contrary. It is also to be understood that the specific devices and processes illustrated in the attached drawings, and described in the following specification are simply exemplary embodiments of the concepts defined herein. Hence, specific dimensions, directions or other physical characteristics relating to the embodiments disclosed are not to be considered as limiting, unless expressly stated otherwise.

Referring now to FIGS. 1-6B, a linear actuator mechanism 100 is depicted. The linear actuator mechanism 100 includes a drive nut 110, a compression spring 112, two spring plates 114, 116, a shift fork 118, a drive screw 120 and a stationary guide rod 122.

Figures 2A, 2B:
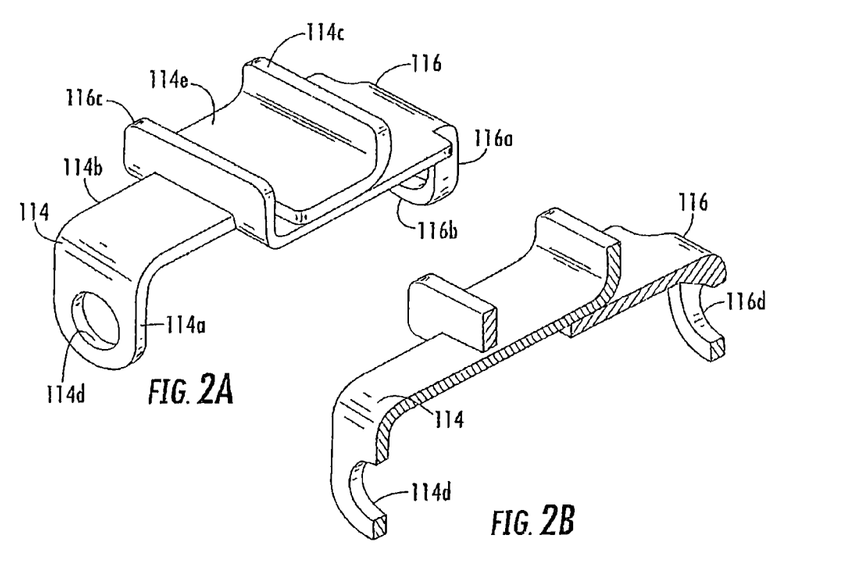
FIG. 2A is a perspective view of a preferred embodiment of the spring plates of the linear actuator mechanism of FIG. 1.
FIG. 2B is cross-sectional view of the spring plates of FIG. 2A.

As shown in FIGS. 2A-2B, the spring plates 114, 116 each have a first radially extending portion 114a, 116a on one end of an axially extending portion 114b, 116b and a second radially extending portion 114c, 116c on the opposite end of the axially extending portion 114b, 116b. The first 114a, 116a and second radially extending portions 114c, 116c extend from the axially extending portions 114b, 116b in radially opposite directions from each other. The compression spring 112 extends between the first radially extending portions 114a, 116a of the spring plates 114, 116, radially inward from the axially extending portions 114b, 116b and may be connected therewith.

The axially extending portion 114b of spring plate 114 is positioned radially outward from the axially extending portion 116b of spring plate 116 such that the axially extending portions 114b, 116b are in at least partial contact with each other. In one embodiment, spring plate 114 has an increased width portion 114e on the axially extending portion 114b near the second radially extending portion 114c. The increased width portion 114e has a width larger than the width of the second radially extending portion 116c of spring plate 116 such that the second radially extending portion 116c is limited in axial movement by the increased width portion 114e. Additionally, the second radially extending portion 116c of spring plate 116 fits on top of the axially extending portion 114b of spring plate 114.

Figure 3A:
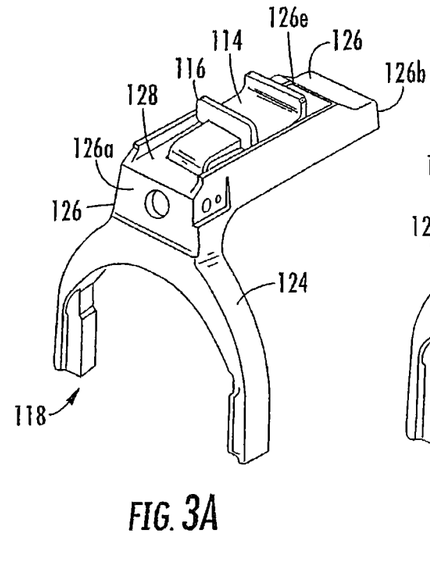
FIG. 3A is a perspective view of a preferred embodiment of the shift fork of the linear actuator mechanism of FIG. 1.
Figure 3B:
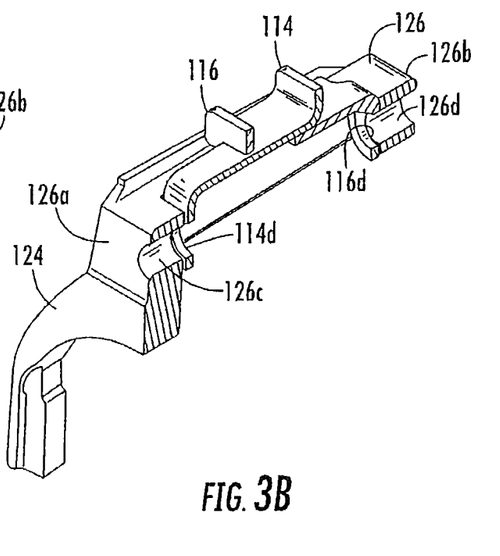
FIG. 3B is cross-sectional view of the shift fork of FIG. 3A.

As shown in FIG. 3A-3B, in some embodiments, the shift fork 118 includes an arm portion 124 and a sleeve portion 126. The arm portion 124 includes a shift collar (not shown) which selectively engages or disengages a disconnect gear (not shown). In some embodiments, the sleeve portion 126 is generally rectangular in shape with end portions 126a, 126b, an outer surface 128 and an inner surface (not shown). The sleeve portion 126 is connected to arm portion 124 on one end portion 126a thereof. End portions 126a, 126b have apertures 126c, 126d in the center thereof. The apertures 126c, 126d in end portions 126a, 126b are sized to allow the stationary guide rod 122 to extend through sleeve portion 126. The apertures 126c, 126d in the sleeve portion 126 align with a set of apertures 114d, 116d in the first radially extending portions 114a, 116a of the spring plates 114, 116 respectively such that the stationary guide rod 122 extends through the apertures 114d, 116d in the spring plates 114, 116 and the apertures 126c, 126d of the spring fork 118. In some embodiments, apertures 114d, 116d, 126c, 126d are generally circular in shape.

Additionally, the outer surface 128 of the sleeve portion 126 has an aperture 126e on the radially outer surface 128 thereof which the axially extending portions 114b, 116b extend therethough and axially along.

Figure 1:
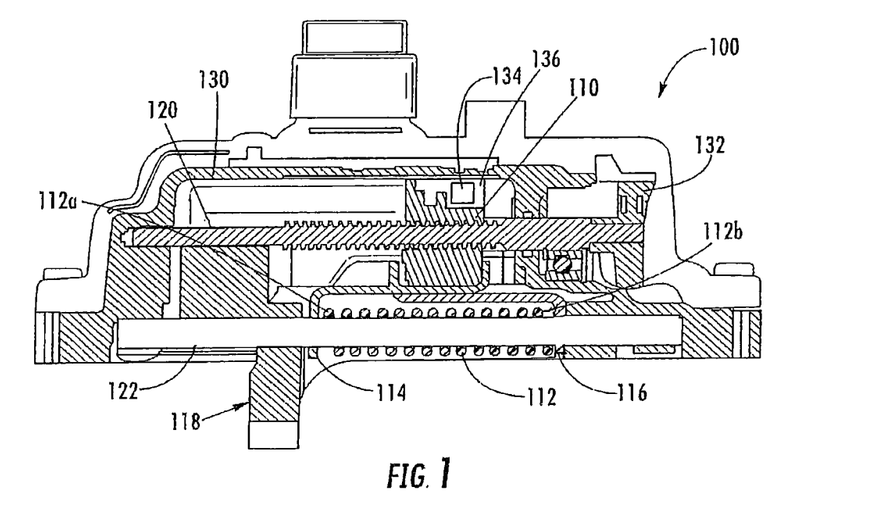
FIG. 1 is a side view of a preferred embodiment of a linear actuator mechanism.

The first radially extending portions 114a, 116a are positioned within the sleeve portion 126 of the shift fork 118 such that when the compression spring 112 is not compressed the first radially extending portions 114a, 116a are located adjacent the end portions 126a, 126b of the sleeve portion 126. The second radially extending portions 114c, 116c extend radially outward from the outer surface 128 and the second radially extending portion 114c extends such that it is adjacent one side of the drive nut 110 and the other second radially extending portion 116c extends such that is adjacent the other side of the drive nut 110 as shown in FIG. 1.

Figure 4A:
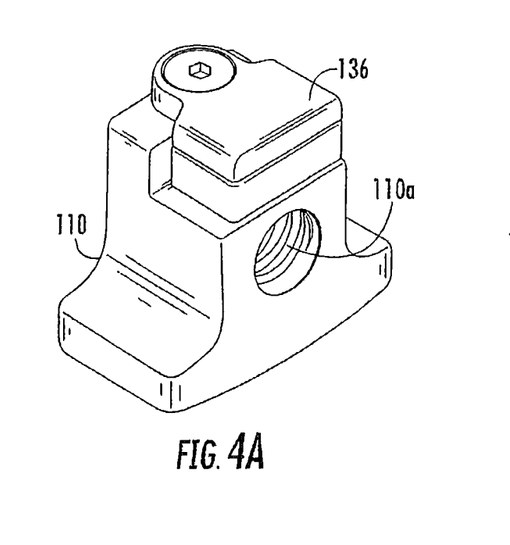
FIG. 4A is a perspective view of a preferred embodiment of the drive nut of the linear actuator mechanism of FIG. 1.
Figure 4B:
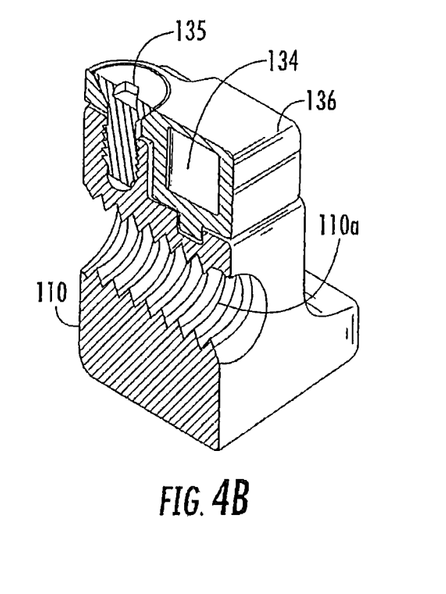
FIG. 4B is cross-sectional view of the drive nut of FIG. 4A.
Figure 5:
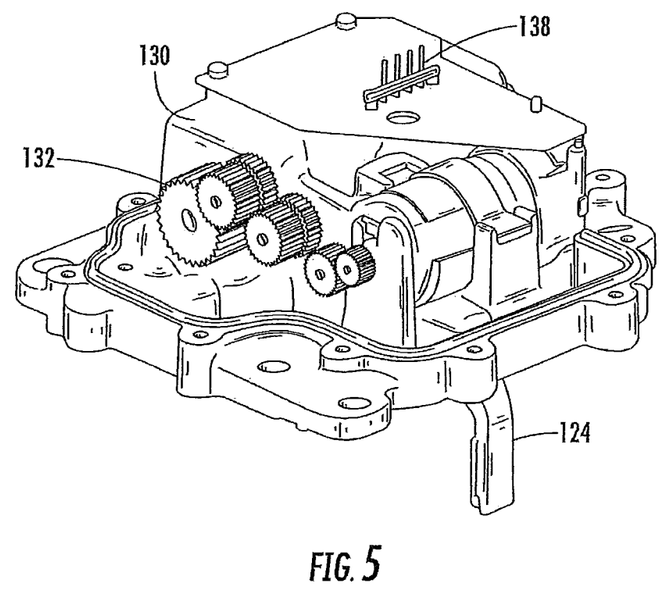
FIG. 5 is a perspective view of a top portion of the linear actuator mechanism of FIG. 1.

As shown in FIGS. 4A-4B, the drive nut 110 has a threaded aperture 110a that extends axially through the drive nut 110. The drive nut 110 is threaded onto the drive screw 120. The drive screw 120 extends axially through the aperture 110a such that the drive nut 110 is capable of moving along the drive screw 120. The drive nut 110 is positioned radially outward from the sleeve portion 126 of the shift fork 118 and the stationary guide rod 122. In some embodiments, the drive screw 120 has a set of external threads.

Referring back to FIG. 1, the compression spring 112 is a coil spring having two axial ends 112a, 112b. The axial ends 112a, 112b abut the inner surface of the first radially extending portions 114a, 116a of the spring plates 114, 116. The compression spring 112 is positioned within the sleeve 126 of the spring fork 118 radially inward from the axially extending portions 114b, 116b of the spring plates 114, 116. The compression spring 112 compresses as the first radially extending portion 114a of spring plate 114 moves towards the first radially extending portion 116a of spring plate 116 loading the compression spring 112. The compression spring 112 stores energy such that compression spring 112 can force engagement/disengagement of gears, etc. The compression spring 112 has a compression rate that can be adjusted for the specific applications needs. The peak force of compression spring 112 is selected such that it can be compressed by an electric motor (not shown) or other primary mover.

In some embodiments, a casing 130 houses the spring plates 114, 116, the drive nut 110, the stationary guide rod 122, the compression spring 112, a portion of the drive screw 120, a portion of the stationary guide rod 122 and the sleeve portion 126 of shift fork 118. The drive screw 120 extends through one end of casing 130. In some embodiments, the drive screw 120 extends through the other end of the casing 130 and is drivingly connected to a pinion gear 132. The shift fork 118 has limited linear movement based on the size of the casing 130. In some embodiments, the casing 130 is made of any non-magnetic material including, but not limited to, aluminum.

In one embodiment, the actuator mechanism 100 is part of system including an electric motor (not shown) which moves a disconnect gear (not shown). In other embodiments, other power sources are used to move the disconnect gear. In some embodiments, the electric motor moves the drive screw 120 axially in either direction that moves the spring plates 114, 116 along the stationary guide rod 122. When the drive nut 110 moves within the casing 130 along the drive screw 120, the shift fork 118 is moved via the spring plates 114, 116 and the compression spring 112 to selectively engage/disengage a shift collar (not shown). However, the actuator mechanisms provided herein can be used for other applications requiring a linear actuator.

When the linear actuator mechanism 100 is in an unblocked disengaged position and it is desired to engage the disconnect gear, an electric motor moves the drive nut 110 and the shift fork 118 to the opposite end of casing 130. The spring plates 114, 116 remain spaced apart and do not compress the compression spring 112.

If during the shift from disengaged to engaged the shift fork 118 becomes blocked, the electric motor moves the drive nut 110 along the drive screw to the other end of the casing 130 while the shift fork 118 remains in place. This causes the first radially extending portions 114a, 116a to move axially closer to each other and compress the compression spring 112. The shift fork 118 can become blocked when a torque transfer condition does not permit the shift fork 118 to be moved, for example, out of a neutral gear position. By compressing the compression spring 112, the compression spring 112 is loaded with a force such that when the shift fork 118 becomes unblocked, the force moves the shift fork 118.

Similarly, if linear actuator mechanism 100 is in the unblocked engaged position and, when trying to move to the disengaged position the shift fork 118 becomes blocked, the first radially extending portions 114a, 116a move closer to each other and compress the compression spring 112. By compressing the compression spring 112, the compression spring 112 is loaded with a force such that when the shift fork 118 becomes unblocked, the force moves the shift fork 118 to the disengaged position on the stationary guide rod 122. Therefore, the compression spring 112 is loaded by the movement of the spring plates 114, 116 regardless of the direction the drive screw 120 is travelling.

In some embodiments, the linear actuator mechanism 100 further includes a direct position sensing system for sensing the position of the shift fork 118. As shown in FIGS. 4A-4B, in some embodiments, a magnet 134 is coupled to the drive nut 110 such that it is radially outward from the drive screw 120. The magnet 134 is positioned in a housing 136 that is attached to the drive nut 110. The magnet 134 moves linearly with the drive nut 110. The position of the magnet 134 is read by a PCB 138. In some embodiments, the PCB 138 is positioned outside the casing 130 and is substantially planar to the casing 130.

In some embodiments, the PCB 138 has at least one magnetic field sensor including, but not limited to, a Hall Effect sensor, a flux gate sensor, a reed switch, etc., mounted thereto along with associated circuits and traces for powering the sensor(s) and providing outputs from the sensor(s). The position of the magnet 134 can vary; however, the PCB 138 with the sensor thereon is positioned close enough to the magnet 134 to directly sense the position. In some embodiments, the PCB 138 is positioned on top of the casing 130. In some embodiments, the PCB 138 can send a signal relating to the position of the drive nut 110 to a controller, which uses the signal to determine when the electric motor should turn off and on.

Figure 6A:
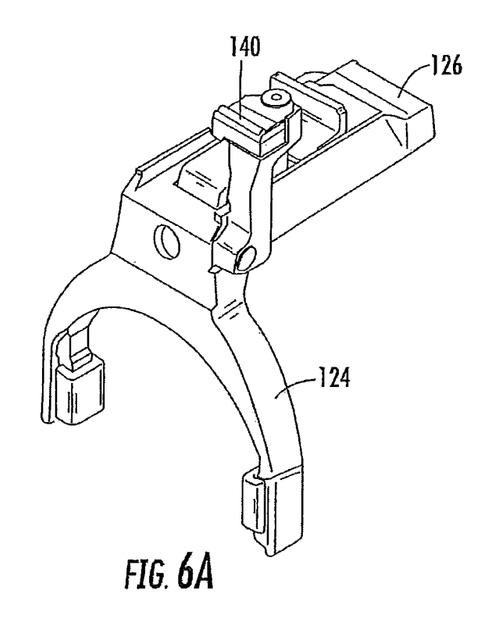
FIG. 6A is a perspective view of a preferred embodiment of the shift fork, magnet and spring plates of the linear actuator mechanism of FIG. 1.
Figure 6B:
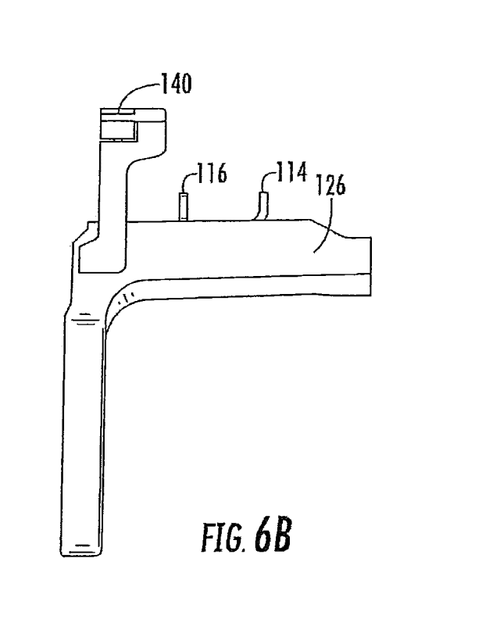
FIG. 6B is cross-sectional view of the shift fork, magnet and spring plates of FIG. 6A.

In some embodiments, a second magnet (not shown) is connected directly to the shift fork 118 and to monitor the position of the shift fork 118 using the PCB 138. As shown in FIGS. 6A-6B, in some embodiments, the second magnet is positioned in a housing 140 connected to the arm portion 124 of the shift fork 118 such that the second magnet extends radially above, and the outward from, the sleeve portion 126 and radially above the spring plates 114, 116. The two magnets operate independently of each other. However, the two magnets are relatively at the same radial height such that the PCB 138 can sense the position of both magnets.

Figure 7:
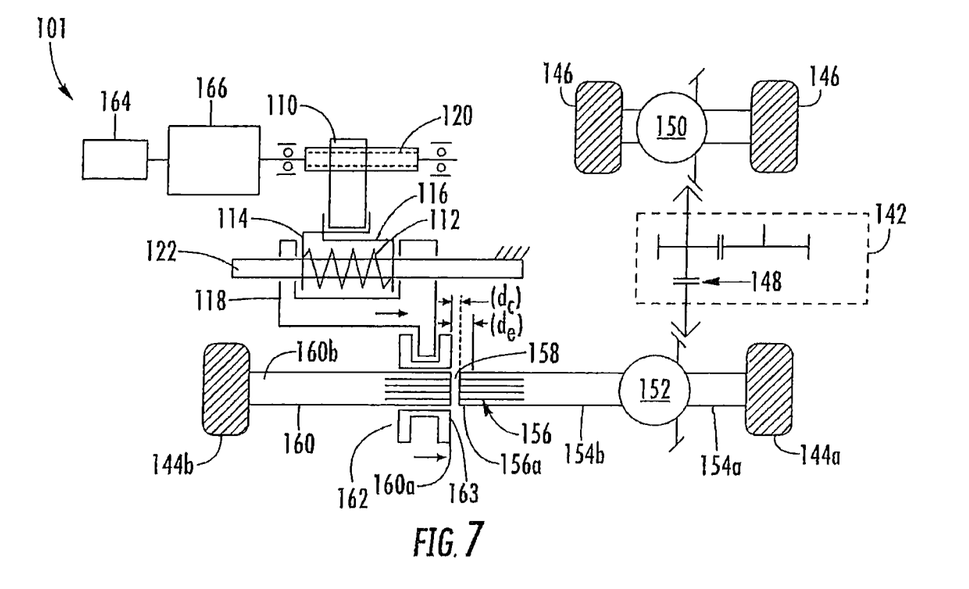
FIG. 7 is a schematic representation of the linear mechanism of FIG. 1 in a vehicle axle disconnect system.

One embodiment of a wheel connect/disconnect system 101 for a vehicle having the linear actuator mechanism 100 is depicted in FIG. 7. In some embodiments, the vehicle has an engine (not shown) connected to a transmission (not shown). The transmission is connected to a transfer case 142 that divides the power between a set of front wheels 144 and a set of rear wheels 146. In some embodiments, a clutch 148 is located in the transfer case 142 to selectively connect/ reconnect the front wheels 144.

The transfer case 142 is connected to a rear differential 150, which is connected to the rear wheels 146. The transfer case 142 is also connected to a front differential 152. The front differential 152 is connected to a first axle half shaft 154*a* and a second axle half shaft 154*b*. The first axle half 154*a* shaft is connected to one of the front wheels 144*a*.

The second axle half shaft 154*b* has a plurality of circumferentially extending splines 156 of an outer surface on an end portion 156*a*. A gap 158 separates the end portion of the second axle half shaft 154*b* and a stub shaft 160. The gap 158 permits independent rotation of the second axle half shaft 154*b* and the stub shaft 160. An inboard end portion 160*a* of the stub shaft 160 has a plurality of circumferentially extending splines 161 on an outer surface thereof. An outboard end portion 160*b* of the stub shaft 160 carries at least one wheel 144*b* thereon.

A shift collar 162 is provided connected to the shift fork 118 or integral therewith. In some embodiments, the shift collar 162 is a ring with a splined inner surface 163. The shift collar 162 is selectively moved axially between the stub shaft 160 and the second axle half shaft 154*b*. In some embodiments, the shift collar 162 is selectively moved by the shift fork 118 that is engaged with the shift collar 162. In some embodiments, the shift fork 118 selectively moves axially along the guide rod 122.

When it is desired to connect the stub shaft 160 with the second axle half shaft 154*b*, the motor 164 rotates. In some embodiments, the rotation of the motor 164 is slowed down through the use of a gear reduction set 166. The gear reduction set 166 rotates, which causes the drive nut 110 to move axially along the drive screw 120. The movement of the drive nut 110 causes the shift fork 118, through the spring plates 114, 116, to move along the guide rod 122. The shift fork 118 axially slides the shift collar 162 so that it connects the stub shaft splines 161 to the second axle half shaft splines 156, and rotationally fixes the two shafts 154*b*, 160 together.

In some embodiments, the shift fork 118 moves the shift collar 162 into an initial or pre-engagement position ($d_c$) with the stub shaft splines 161 by moving axially as shown in FIG. 7. Until the drive nut 110 moves further axially to fully engage the spline sets 161, 156 at a full engagement position ($d_e$) the splines 163 of shift collar and second axle half shaft 156*b* may have tooth on tooth face contact and grind against one another. The initial contact of the spline sets 161, 156 may result in tooth engagement jump out, high axial reaction forces, undesirable noise and vibration and a time delay for full spline engagement.

Figure 8:
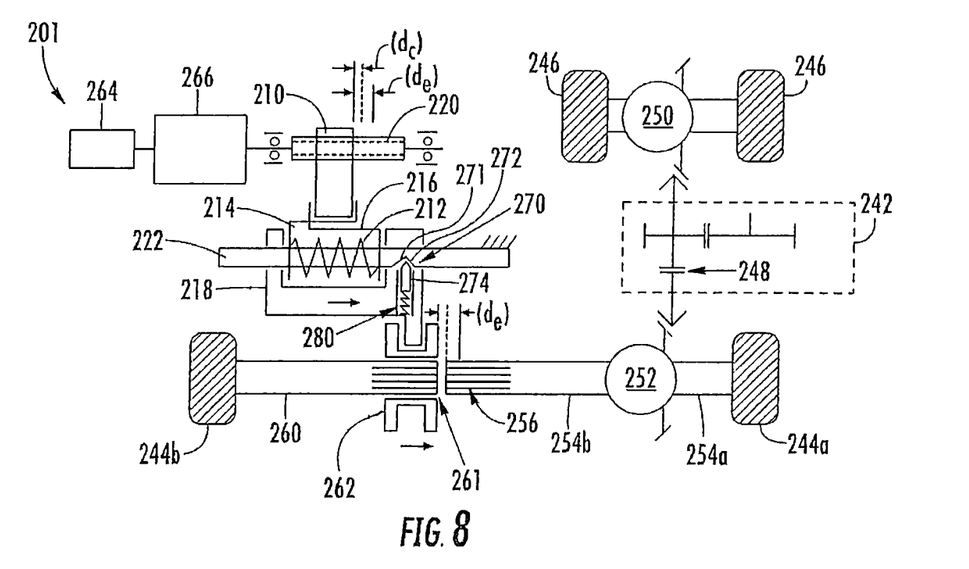
FIG. 8 is a schematic of another embodiment of a vehicle axle disconnect system.

Turning now to FIG. 8, one embodiment of a vehicle axle disconnect/connect system 201 is depicted. The system 201 has the features described above and depicted in FIG. 7 except as noted below. Similar components are shown having similar reference numerals. Accordingly, the descriptions of similarly numbered elements from system 101 are incorporated herein by reference and only differences will be discussed in detail.

In some embodiments, the guide rod 222 includes a detent notch 270, as shown in FIG. 8. In some embodiments, the notch 270 includes a first ramp 271 and a second ramp 272. In some embodiments, the first and second ramps 271, 272 are connected together to form an integral piece. More particularly, in some embodiments, the ramps 271, 272 are connected at a predetermined point along the guide rod 222 so that the first ramp 271 is axially longer than the second ramp 272. In some embodiments, the first ramp 271 has a more gradual slope than the second ramp 272.

A plunger 274 is provided in or on the shift fork 218. In some embodiments, the plunger 274 is a ball or a cylindrical body with an engagement portion 276 connected to the end the cylindrical body 278. In some embodiments, the engagement portion 276 is spherical or tapered, such as with a singled tapered surface or double tapered surface. A biasing member 280 including, but not limited to, a spring is connected to the plunger 274. As shown in FIG. 8, the biasing member 280 is designed to bias the plunger 274 in the radial direction. More particularly, in some embodiments, the plunger spring 280 is located radially beneath the plunger 274 so that at the plunger 274 is positioned radially between the plunger spring 280 and the guide rod 222. In some embodiments, the plunger spring 280 is located in or on the shift fork 218. In some embodiments, the plunger 274 and plunger spring 280 are located within a housing 292 to guide and/or maintain them in a generally radial direction. The housing 292 is located in or on the shift fork 218. Thus, the housing 292, plunger 274 and plunger spring 280 axially move with the shift fork 218.

When it is desired to connect the stub shaft 260 with the second axle half shaft 254*b*, the motor 264 rotates, through the gear reduction set 266 causing the drive nut 210 to move axially along the drive screw 220. The movement of the drive nut 210 causes the shift fork 218, through the spring plates 214, 216, to move along the guide rod 222. In addition, the housing 292, plunger 274 and plunger spring 280 move with the shift fork 218. The plunger engagement portion 276 of the plunger slides axially along the outer surface of the guide rod 222. As the shift fork 218 continues to move in the axial direction, the plunger engagement portion 276 engages with the first ramp 271. The plunger spring 280 biases the plunger 274 in the radial direction along the first ramp 271 into the detent notch 270 as the plunger 274 is also moved in the axial direction by the shift fork 218. The plunger engagement portion 276 continues to move in the axial direction, but out of the detent notch 270 along the second ramp 272 as the shift fork 218 moves in the axial direction. It can be appreciated that the second ramp 272 has a steeper angle creating a resistance to the axial movement of the shift fork 218, plunger 274 and plunger spring 280 as the drive nut 210 continues to move. The compression spring 212 continues to build force as the drive nut 210 axial movement progresses.

Once the compression spring 212 is compressed an equal distance to the engagement distance ($d_e$), the shift collar 262 may be prevented from contacting the second axle half shaft splines 256 because the plunger 274 remains in the detent notch 270. When the compression spring 212 is compressed to an extent that it is able to overcome the plunger spring 280 force urging the plunger 274 in the detent notch 270, the plunger 274 rides out of the detent notch 270 and the spring plates 214, 216, the compression spring 212, the shift fork 218, plunger 274, plunger spring 280, and the shift collar 262 all move together. The shift fork 218 axially slides the shift collar 262 so that it connects the stub shaft splines 261 through a set of splines 263 on radially inner surface of the shift collar to the second axle half shaft splines 256 to connect, and rotationally fix, the two shafts 260, 254*b* together. As can be appreciated by the above, the system 201 prevents the shift collar 262 from contacting the second axle half shaft splines 256 until the shift collar 262 is able to travel the full engagement distance ($d_e$).

Figure 9:
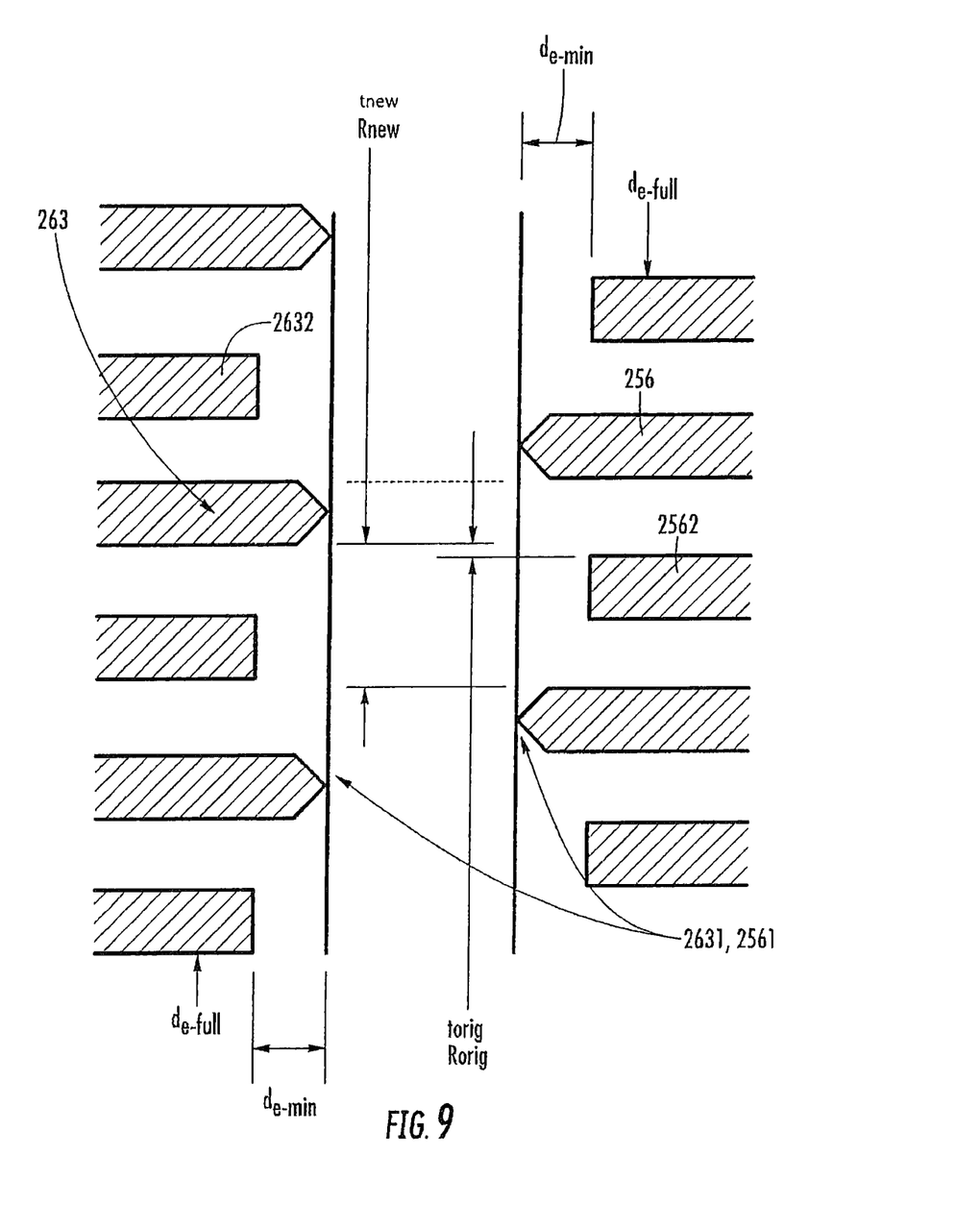
FIG. 9 is a detailed schematic of one embodiment of the spline sets of the vehicle axle disconnect system of FIG. 8.

FIG. 9 depicts a schematic detailed view of the splines 256 of the second axle half shaft 254*b* and the splines 263 on the shift collar 262. In some embodiments, a portion of splines 256 on the second axle half shaft 254b and the shift collar 262 extend to the ends of the respective shaft 254b and shift collar 262 and a portion of the splines on the shaft 254b and shift collar 262 do not extend to the ends. In some embodiments, a set of splines that extend to the ends full length, or regular splines, 2631, 2561 have tapered ends. In some embodiments, a set of splines that do not extend the full length, or shortened splines, 2632, 2562 alternate with the regular splines 2631, 2561 about the circumference of the second axle half shaft 254b and shift collar 262. The amount of spline removed from the shortened splines 2632, 2562 is preferably a minimal engage distance ($d_{e-min}$).

In some embodiments the splines 2631, 2561, 2632, 2562 have different shapes and lengths to facilitate rapid and consistent engagement of the shift collar splines 263 with the second axle half shaft splines 256. The shape and different lengths of the splines 2631, 2561, 2632, 2562 provides a gap $R_{orig}$ between the engagement the shift collar 262 and second axle half shaft 254b. As seen in FIG. 9, in some embodiments, the full length splines 2631, 2561 have a double tapered end that terminates in a point at the end of the collar/shaft 262, 254b. In some embodiments, the shortened splines 2632, 2562 have a blocked, or squared-off, flat end. The shortened splines 2632, 2562 reduce the likelihood that corresponding engaging splines come into initial tooth endpoint to tooth endpoint contact with one another. The relative angular velocity between the shift collar 262 and the second axle half shaft 254b and the radial gap $R_{orig}$ determine the amount of time the spines are aligned for engagement. The shortened splines 2632, 2562 provide a larger radial gap $R_{new}$, which in turn, provides a greater amount of time for the respective splines 263, 256 to be aligned for engagement. This reduces or eliminates non-engagement of the splines 263, 256 due to tooth on tooth contact, which can result in tooth engagement jump out, high axial reaction forces, unwanted noise and/or vibration in the system and vehicle, and a time delay for full spline engagement. It can be appreciated that the increased spline radial gap $R_{new}$ provided by the shortened splines 2632, 2563 results in radial backlash. However, upon full engagement of the splines 263, 256 the backlash is eliminated.

Figure 10:
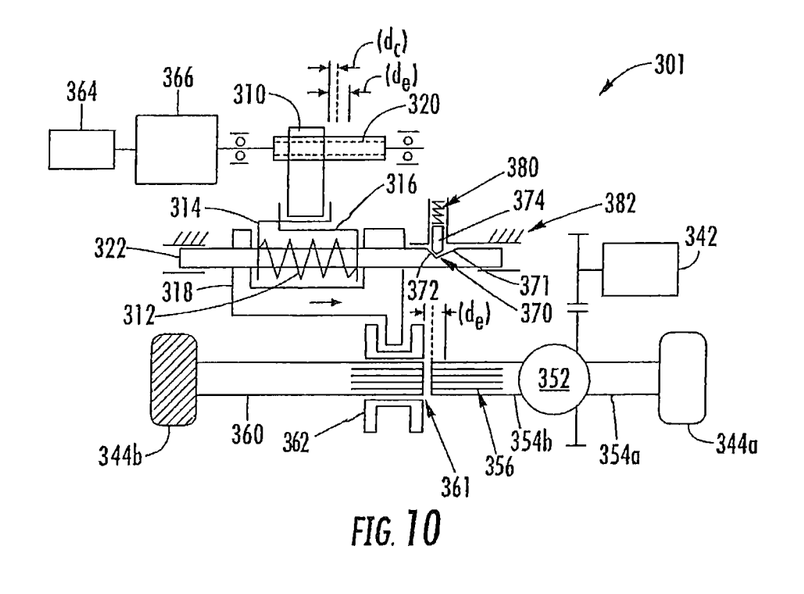
FIG. 10 is a schematic of another embodiment of a vehicle axle disconnect system.

Turning now to FIG. 10, another embodiment of a connect/disconnect system 301 is schematically depicted. The system 301 has the features described above and depicted in FIG. 8 except as noted below. Similar components are shown having similar reference numerals. Accordingly, the descriptions of similarly numbered elements from system 201 are incorporated herein by reference and only differences will be discussed in detail.

As shown in FIG. 10, in some embodiments, the guide rod 322 extends through the shift fork 318, the spring plates 314, 316 and the compression spring 312. The guide rod 322 is securely connected to the shift fork 318 to provide robust support to the shift fork 318. The guide rod 322 slides axially within a housing. In particular, the guide rod 322 slides within a Front Axle Disconnect (FAD) housing 382. In some embodiments, the FAD housing 382 includes the shift fork 318, spring plates 314, 316, and the compression spring 312. In some embodiments, the FAD housing 382 also optionally includes the motor 364, gear reduction set 366, drive nut 310 and drive screw 320.

In some embodiments, the guide rod 322 is provided with a detent notch 370, as shown in FIG. 10. In some embodiments, the notch 370 includes a first ramp 371 and a second ramp 372. In some embodiments, the first and second ramps 371, 372 are connected together to form an integral piece. More particularly, the ramps 371, 372 are connected at a predetermined point within the guide rod 322 so that the first ramp 371 is axially longer than the second ramp 372. The first ramp 371 has a more gradual slope than the second ramp 372.

In some embodiments, the plunger 374 is provided in or on the housing 382. A biasing member 380, such as a plunger spring, is connected to the plunger 374. In some embodiments, the biasing member 380 is designed to bias the plunger 374 in a radial direction. More particularly, the plunger spring 380 is located beneath the plunger 374 such at the plunger 374 is between the plunger spring 380 and the guide rod 322. The plunger spring 374 is also located in or on the FAD housing 382.

In some embodiments, the plunger 374 and plunger spring 380 is located within a separate housing to guide and/or maintain them in a generally radial direction. The separate housing is located in or on the FAD housing 382. Thus, the separate housing, plunger 374 and plunger spring 380 move radially within the FAD housing 382.

When it is desired to connect the stub shaft 360 with the second axle half shaft 354b, the motor 364 rotates which moves the drive nut 310 to move axially along the drive screw 320. The movement of the drive nut 310 causes the shift fork 318 and guide rod 322, through the spring plates 314, 316 to move axially within the FAD housing 382. In addition, the housing, plunger 374 and plunger spring 380 move radially within the FAD housing 382.

In some embodiments, the system 301 operates in two modes. In some embodiments, the system 301 operates in a passive mode and an active mode. In the passive mode, the drive nut 310 moves from the pre-engagement distance ($d_c$) to a full engagement distance ($d_e$) once the plunger 374 is moved out of the notch 396 by the force built up by compression spring 312. The potential energy built up in the compression spring 312 quickly results in the drive nut moving axially to a full engagement distance (de) when the plunger 374 is out of the notch 396.

In the active mode, the system 301 includes a controller or an electronic control unit (ECU) that receives input signals from various sensors, such as front and rear wheel speed sensors, a mode selection switch, motor current sensors, an ABS, position sensors, etc. The ECU includes software embedded therein. The ECU can detect pre-engagement of the system 301 by detecting a wheel speed difference, such as a speed difference between the front wheels 344. In some embodiments, the ECU includes a calibration table in the software that maps the motor current requirements for different engagement levels such as for full engagement and pre-engagement. The pre-engagement distance (dc) is detected in some embodiments, when the plunger 374 is not engaged in the notch 396 by monitoring the motor current feedback, wheel speed sensor differential, input signals from the spring plate 314, 316 using potentiometer, LVDT etc. In some embodiments, the ECU controls the motor current such that the drive nut 310 on the guide rod 322 forces the plunger 374 out of the notch 396 after the pre-engagement distance (dc) is reached. Until pre-engagement is detected, the motor current does not rise sharply. This prevents the sets of splines 363, 356 from abutting one another. In some embodiments, the ECU is an open loop variant. In some embodiments, the ECU receives in signals relating to the position of the spring plate 314, 316 providing a closed loop variant. In some embodiments, the closed loop variant includes a potentiometer to detect the position of the spring plates 314, 316. In some embodiments, the ECU is positioned in the FAD housing 382. In some embodiments, the ECU uses adaptive control to predict future states of operation (such as timing for engagement/disengagement, position of components, offsets, motor current levels at different part position/offsets, etc). The adaptive control system and method described above can be used for each of the embodiments disclosed herein.

Figure 11:
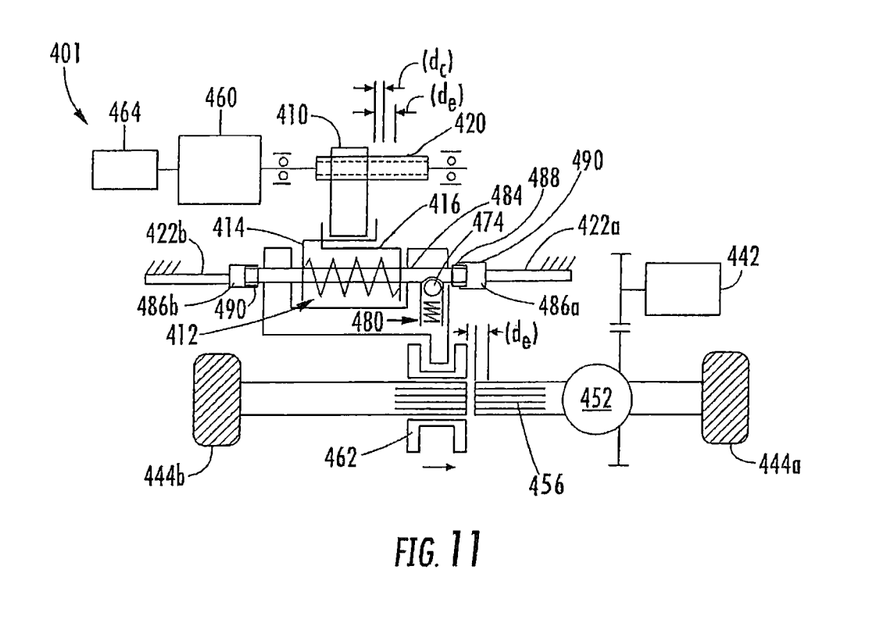
FIG. 11 is a schematic of another embodiment of a vehicle axle disconnect system.

Turning now to FIG. 11, another embodiment of a connect/disconnect system 401 is schematically depicted. In this embodiment, the system 401 includes a two-piece guide rod 422. The system 401 has the features described above and depicted in FIG. 8 except as noted below. Similar components are shown having similar reference numerals. Accordingly, the descriptions of similarly numbered elements from system 201 are incorporated herein by reference and only differences will be discussed in detail.

As shown in FIG. 11, the guide rod 422 includes a first guide rod piece 422a and a second guide rod piece 422b. The first guide rod piece 422a and the second guide rod piece 422b are fixed to a set of busings 486a, 486b. In some embodiments, the guide rod pieces 422a, 422b each have inboard end portions that are integral with the bushings 486a, 486b. A spring plate rod 484 is provided, extending axially between the bushings 486a, 486b. The spring plate rod 484 extends through the shift fork 418, the spring plates 414, 416 and the compression spring 412. In some embodiments, the spring plate rod 484 includes a set of nuts 488 with friction caps 490 on either end of the rod 484. The caps 490 are located within the bushings 486a, 486b to selectively axially slide with respect to one another. The above-described structure functions to securely connect the shift fork 418 to the fixed guide rod 422 to provide robust support to the shift fork 418.

In some embodiments, the plunger 474 is spherical or round shaped as shown in FIG. 11. The notch 470 is also rounded such that the plunger 474 is able to be positioned within the notch 470. In some embodiments, the notch 470 has a first portion or ramp 471 that is larger or steeper than a second portion or ramp 472.

As noted above, the shift fork 418, compression spring 412 and spring plates 414, 416 axially move as one unit when moved by the drive nut 410. In some embodiments, the spring plates 414, 416 are connected to the shift fork 418, such as by mechanical fasteners. The spring plate rod 484 axially moves with the shift fork 418, compression spring 412 and spring plates 414, 416 by virtue of the drive nut 410 translating in the bushings 486a, 486b.

Figure 12:
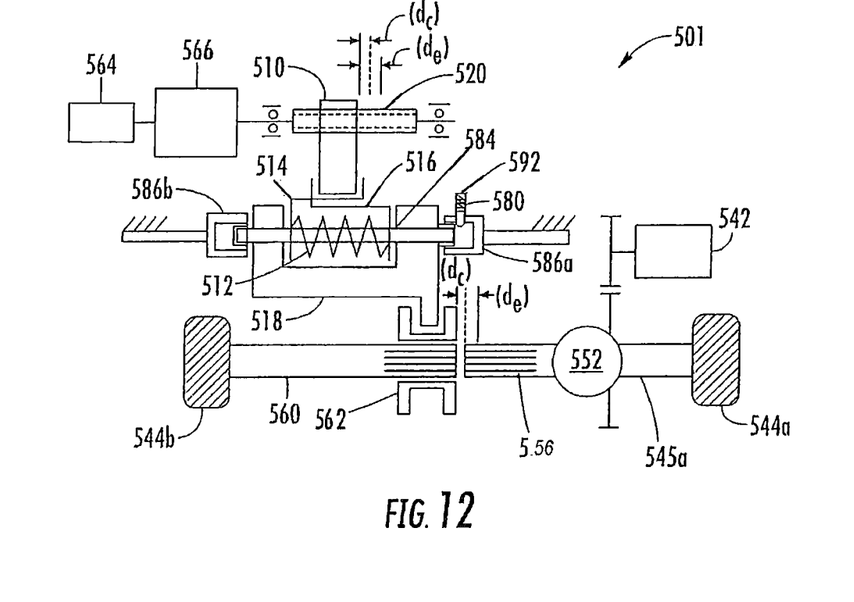
FIG. 12 is a schematic of another embodiment of a vehicle axle disconnect system.

Turning now to FIG. 12, another embodiment of a connect/disconnect system 501 is schematically depicted. In this embodiment, the system 501 includes a two-piece guide rod 522. The system 501 has the features described above and depicted in FIG. 10 except as noted below. Similar components are shown having similar reference numerals. Accordingly, the descriptions of similarly numbered elements from system 501 are incorporated herein by reference and only differences will be discussed in detail.

As shown in FIG. 12, in some embodiment, the system 501 includes a plunger housing 592. The plunger housing 592, plunger 574 and a biasing member 580 are connected to one of the bushings 586a. More particularly, in some embodiments, the plunger housing 592 is directly connected to the bushing 586a. In some embodiments, the plunger housing 592 is integral with the bushing 586a. The plunger housing 592 contains the plunger 574 and the biasing member 580. In some embodiments, an aperture 594 is provided through the bushings 586a, 586b so that the plunger 574 can selectively radially extend through the bushing 586a. In some embodiments, an engagement end portion 578 of the plunger 574 is located radially adjacent nut 588.

Figure 13:
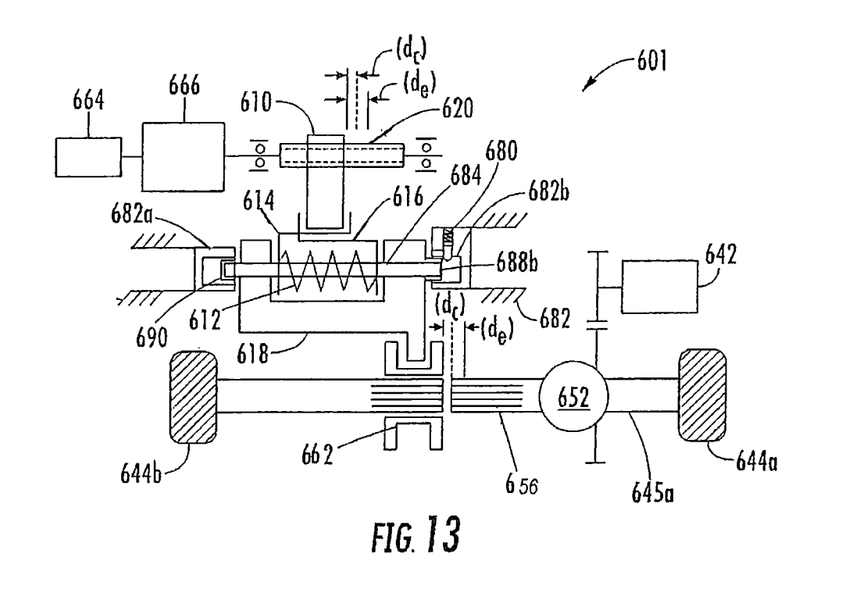
FIG. 13 is a schematic of another embodiment of a vehicle axle disconnect system.

Turning now to FIG. 13, another embodiment of a connect/disconnect system 601 is schematically depicted. The system 601 has the features described above and depicted in FIG. 12 except as noted below. Similar components are shown having similar reference numerals. Accordingly, the descriptions of similarly numbered elements from system 501 are incorporated herein by reference and only differences will be discussed in detail.

In some embodiments, as depicted in FIG. 13, the FAD housing 682 includes pockets 682a, 682b to receive nuts 688a, 688b and friction caps 690 therein, thereby allowing the spring rod 684 to be connected to the FAD housing 682. In this embodiment, the nuts 688a, 688b and friction caps 690 are permitted to axially move within the housing pockets 682a, 682b eliminating the need for bushings. In some embodiments, the plunger housing 692 is integral with the FAD housing 682. By eliminating the guide rod and bushings, the number of parts of the system 601 is reduced thus saving weight, cost and reducing potential failure modes.

Figure 14A:
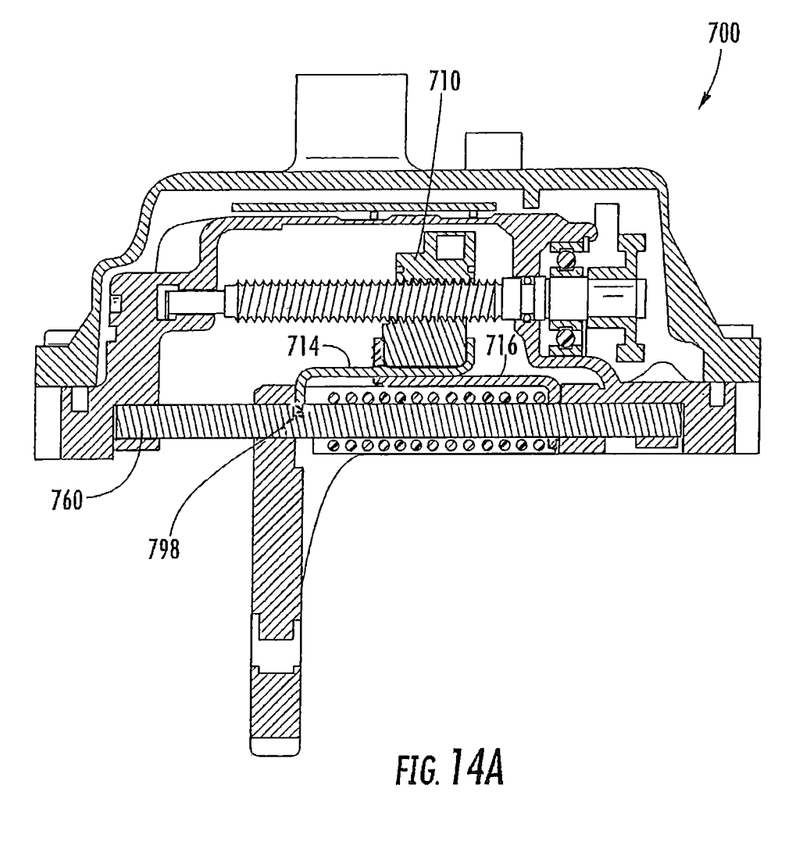
FIGS. 14A-C schematically depict another embodiment of a linear actuator mechanism.
Figure 14B:
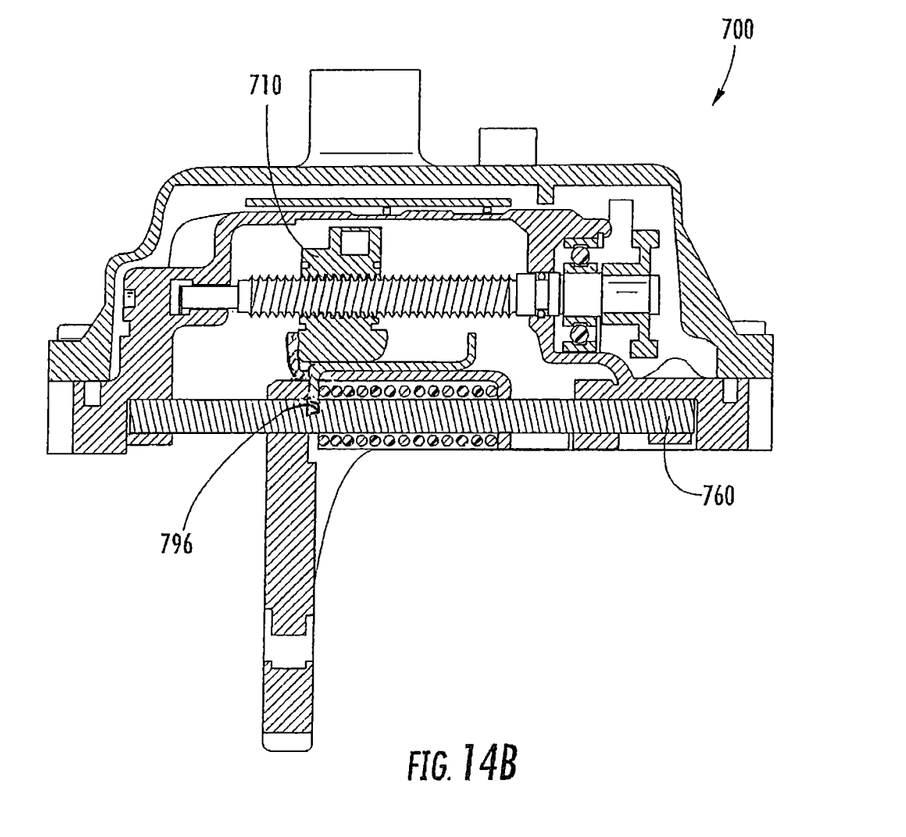
Figure 14C:
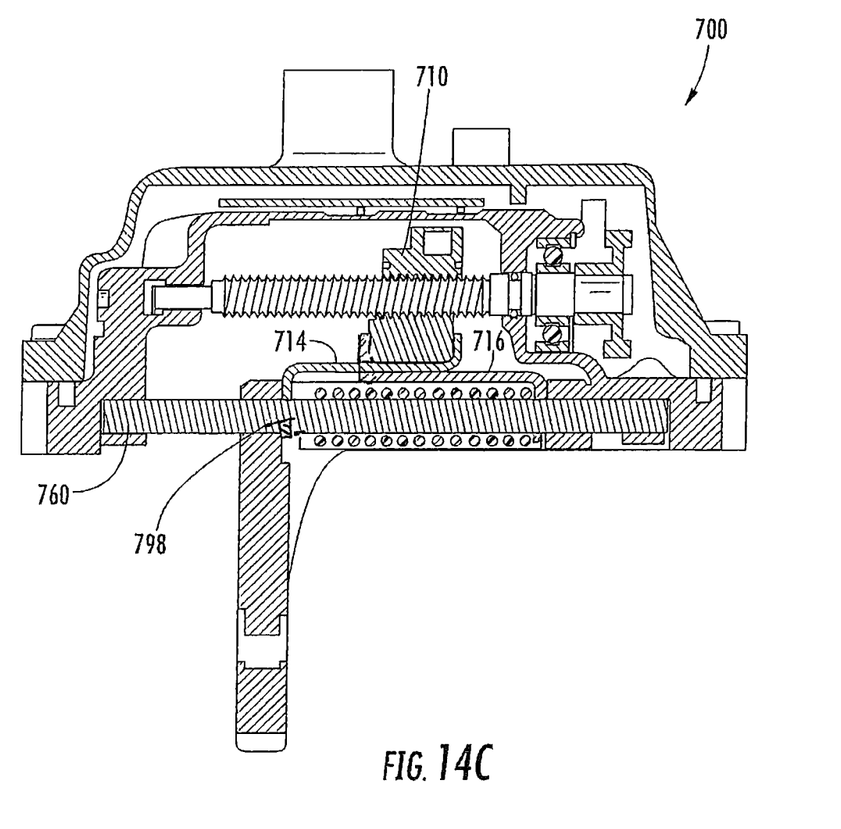

FIGS. 14A-C depict another embodiment of a linear actuator mechanism 700. The actuator mechanism 700 has the features described above and depicted in FIG. 1 except as noted below. Similar components are shown having similar reference numerals. Accordingly, the descriptions of similarly numbered elements from the actuator mechanism 100 are incorporated herein by reference and only differences will be discussed in detail. As shown in FIGS. 14A-B, a notch or groove 796 is provided in a radially upper portion of the guide rod 760. The spring plate 714 drops into the guide rod notch/groove 796 when the mechanism 700 is retracted/disengaged and, therefore, the spring plate 714 will resist movement as the drive nut 710 moves axially as shown in FIG. 14A. When the mechanism 700 is extended/engaged, the drive nut 710 moves axially, building up a high force in the compression spring 712 as the spring plate 714 remains in the groove 796 as shown in FIG. 14B. When the drive nut 710 has travelled the distance ($d_e$) where there is complete spline engagement, the drive nut 710 pushes the spring plate 714 up out of the groove 796 once the spring 712 is sufficiently compressed. Once the spring plate 714 is no longer in the groove 796, the spring 712 is released.

As shown in FIG. 14C in some embodiments, the notch or groove 796 is provided in a radially lower portion of the guide rod 760. The drive nut 710 is used as a pivot so that the compression spring force reacting on the spring plate 714 pivots the spring plate 714 about the drive nut 710. The spring plate 714 drops into the guide rod notch/groove 796 when the mechanism 700 is retracted/disengaged. The compressive force of the spring 712 pivots the spring plate 714 about the drive nut 710 such that the spring plate 714 rotates off center and drops into the groove 796 such that the spring plate 714 is already cocked for when the drive nut 710 moves to an engaged position. When the mechanism 700 is extended/engaged, the drive nut 710 moves axially, building up a high force in the compression spring 712 as the spring plate 714 remains in the groove 796 as shown in FIG. 14B. When the drive nut 710 has travelled the distance ($d_e$) where there is full spline engagement, the drive nut 710 pushes the spring plate 714 out of the groove 796 once the spring is 712 is sufficiently compressed. In some embodiments, when the drive nut 710 travels an engagement distance (de), the drive nut 710 pushes the spring plate 714 out of the groove 796 and the splines 763 on the shift collar 762 completely engage with the splines 761. Once the spring plate 714 is no longer in the groove 796, the spring 712 is released. In some embodiments, a cam bump is positioned at the distance (de) to facilitate calibrating the engagement distance (de).

It should be noted that the description above has provided dimensions for certain components or subassemblies. The mentioned dimensions, or ranges of dimensions, are provided in order to comply as best as possible with certain legal requirements, such as best mode. However, the scope of the preferred embodiments described herein are to be determined solely by the language of the claims, and consequently, none of the mentioned dimensions is to be considered limiting on the preferred embodiments, except in so far as any one claim makes a specified dimension, or range of thereof, a feature of the claim.

The foregoing description details certain embodiments. It will be appreciated, however, that no matter how detailed the foregoing appears in text, the preferred embodiments are practiced in many ways. As is also stated above, it should be noted that the use of particular terminology when describing certain features or aspects of the preferred embodiments should not be taken to imply that the terminology is being re-defined herein to be restricted to including any specific characteristics of the features or aspects of the preferred embodiments with which that terminology is associated.

While preferred embodiments have been shown and described herein, it will be obvious to those skilled in the art that such embodiments are provided by way of example only. Numerous variations, changes, and substitutions will now occur to those skilled in the art without departing from the preferred embodiments. It should be understood that various alternatives to the embodiments described herein could be employed in practice. It is intended that the following claims define the scope of the preferred embodiment and that methods and structures within the scope of these claims and their equivalents be covered thereby.

We claim:

1. A linear actuator mechanism, comprising:
   a stationary guide rod;
   a shift fork having a sleeve portion, wherein the stationary guide rod extends through the sleeve portion;
   a drive nut having an aperture therethrough;
   a drive screw that extends through the aperture of the drive nut parallel to, and radially above, the stationary guide rod;
   a first spring plate having an axially extending portion, a first radially extending portion and a second radially extending portion extending in the opposite direction of the first radially extending portion, wherein the axially extending portion connects the first and second radially extending portions;
   a second spring plate having an axially extending portion, a first radially extending portion and a second radially extending portion extending in the opposite direction of the first radially extending portion, wherein the axially extending portion connects the first and second radially extending portions; and
   a compression spring positioned between the first radially extending portion of the first spring plate and the first radially extending portion of the second spring plate;
   wherein the second radially extending portion of the first spring plate and the second radially extending portion of the second spring plate are in contact with the drive nut on axially opposite sides thereof,
   wherein the drive nut is axially movable along the drive screw, and
   wherein the first and second spring plates are moveable axially along the stationary guide rod by the drive nut to compress the compression spring.

2. The linear actuator mechanism of claim 1, wherein the stationary guide rod includes a notch on an outer surface thereof, wherein the notch includes a first ramp portion and a second ramp portion, wherein the first ramp portion and the second ramp portion are connected together.

3. The linear actuator mechanism of claim 2, wherein the first ramp portion is axially longer than the second ramp portion.

4. The linear mechanism of claim 2, further comprising a plunger and a biasing member,
   wherein the biasing member is located radially beneath the plunger and the plunger is positioned radially between biasing member the and the stationary guide rod, and
   wherein the plunger selectively moves along the first ramp portion and second ramp portion of the notch.

5. The linear mechanism of claim 4, wherein the plunger and biasing member are located on the shift fork.

6. The linear mechanism of claim 1, wherein the stationary guide rod includes a groove on the radially outer surface thereof.

7. A vehicle disconnect/connect system comprising:
   a linear actuator mechanism of claim 1;
   a motor drivingly connected to the drive screw;
   a shift collar having a set of splines there on connected to the shift fork; and
   an axle shaft having a set of splines on the outer surface thereof;
   wherein the splines on the shift collar and the splines on the axle shaft selectively engage.

8. A linear actuator mechanism, comprising:
   a stationary guide rod including a first guide rod piece and a second guide rod piece;
   a first bushing attached to the first guide rod piece;
   a second bushing attached to the second guide rod piece;
   a spring rod having two axial ends, wherein a first axial end is connected to the first bushing and a second axial end is connected to the second bushing;
   a shift fork having a sleeve portion, wherein the spring rod extends through the sleeve portion;
   a drive nut having an aperture therethrough;
   a drive screw that extends through the aperture of the drive nut parallel to, and radially above, the spring rod;
   a first spring plate having an axially extending portion, a first radially extending portion and a second radially extending portion extending in the opposite direction of the first radially extending portion, wherein the axially extending portion connects the first and second radially extending portions;
   a second spring plate having an axially extending portion, a first radially extending portion and a second radially extending portion extending in the opposite direction of the first radially extending portion, wherein the axially extending portion connects the first and second radially extending portions; and
   a compression spring positioned between the first radially extending portion of the first spring plate and the first radially extending portion of the second spring plate,
   wherein the second radially extending portion of the first spring plate and the second radially extending portion of the second spring plate are in contact with the drive nut on axially opposite sides thereof,
   wherein the drive nut is axially movable along the drive screw, and wherein the first and second spring plates are moveable axially along the spring rod by the drive nut to compress the compression spring.

9. The linear mechanism of claim 8, wherein the bushings are integral with the first and second guide rod pieces.

10. The linear mechanism of claim 9, wherein the spring rod includes a set of nuts, wherein each nut has a friction cap on the end thereof, and wherein each friction cap is positioned within a bushing.

11. The linear actuator mechanism of claim 8, wherein the stationary guide rod includes a notch on an outer surface thereof, wherein the notch includes a first ramp portion and a second ramp portion, and wherein the first ramp portion and the second ramp portion are connected together.

12. The linear actuator mechanism of claim 11, wherein the first ramp portion is axially longer than the second ramp portion.

13. The linear mechanism of claim 11, further comprising a plunger and a biasing member,
wherein the biasing member is located radially beneath the plunger and the plunger is positioned radially between the biasing member and the spring rod, and
wherein the plunger selectively moves along the first ramp portion and second ramp portion of the notch.

14. The linear mechanism of claim 13, further comprising a plunger housing housing the plunger and biasing member, wherein the plunger housing is connected to one bushing.

15. A linear actuator mechanism, comprising:
a spring rod having two axial ends, wherein a first axial end is connected to a first nut and a second axial end is connected to a second nut;
a shift fork having a sleeve portion, wherein the spring rod extends through the sleeve portion;
a drive nut having an aperture therethrough;
a drive screw that extends through the aperture of the drive nut parallel to, and radially above, the spring rod;
a first spring plate having an axially extending portion, a first radially extending portion and a second radially extending portion extending in the opposite direction of the first radially extending portion, wherein the axially extending portion connects the first and second radially extending portions;
a second spring plate having an axially extending portion, a first radially extending portion and a second radially extending portion extending in the opposite direction of the first radially extending portion, wherein the axially extending portion connects the first and second radially extending portions;
a compression spring positioned between the first radially extending portion of the first spring plate and the first radially extending portion of the second spring plate; and
a housing having two axially opposing pockets, wherein the first nut is positioned within a first pocket and the second nut is positioned within a second pocket;
wherein the second radially extending portion of the first spring plate and the second radially extending portion of the second spring plate are in contact with the drive nut on axially opposite sides thereof,
wherein the drive nut is axially movable along the drive screw, and
wherein the first and second spring plates are moveable axially along the spring rod by the drive nut to compress the compression spring.

16. The linear actuator mechanism of claim 15, wherein the spring rod includes a notch on an outer surface thereof, wherein the notch includes a first ramp portion and a second ramp portion, and wherein the first ramp portion and the second ramp portion are connected together.

17. The linear actuator mechanism of claim 16, wherein the first ramp portion is axially longer than the second ramp portion.

18. The linear mechanism of claim 17, further comprising a plunger and a biasing member,
wherein the biasing member is located radially beneath the plunger and the plunger is positioned radially between the biasing member and the spring rod, and
wherein the plunger selectively moves along the first ramp portion and second ramp portion of the notch.

19. The linear mechanism of claim 18, further comprising a plunger housing, wherein the plunger and biasing member are positioned within the plunger housing, and wherein the plunger housing is integral with the housing.

\* \* \* \* \*